Patented Oct. 20, 1931

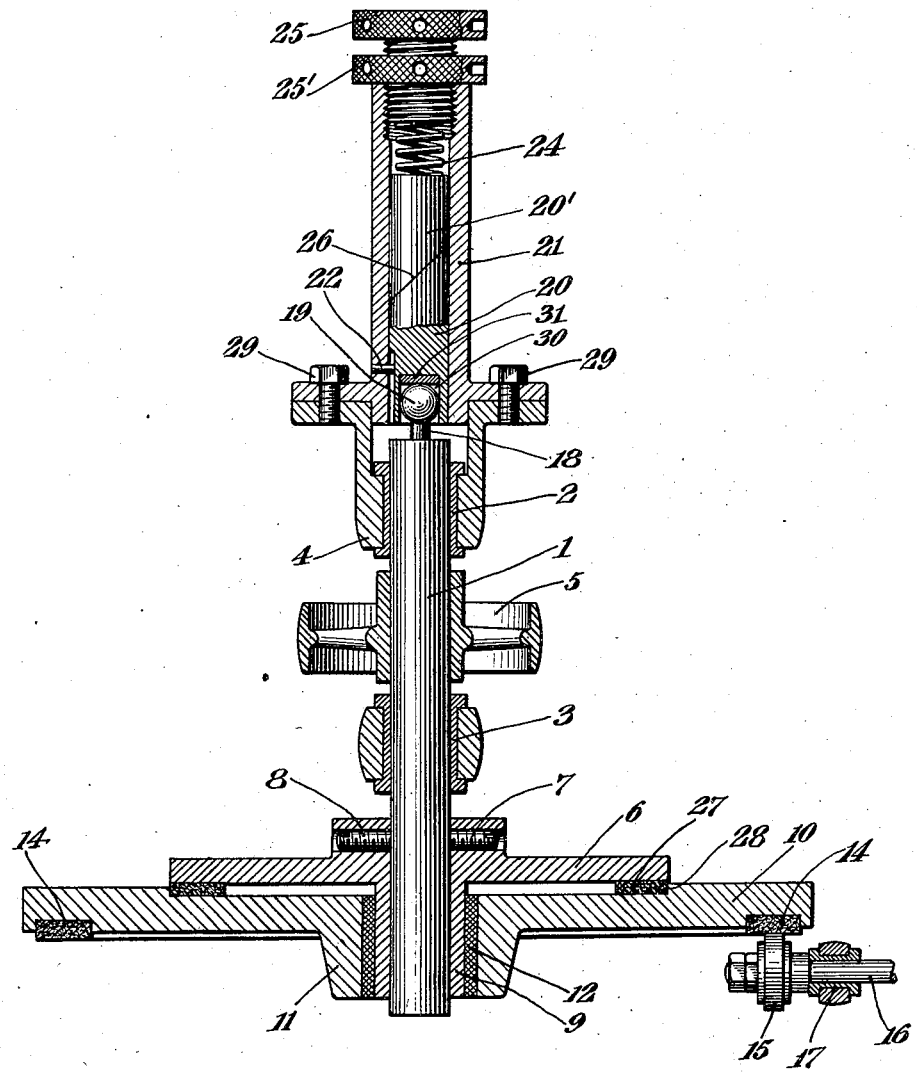

1,827,891

UNITED STATES PATENT OFFICE

LEO D. JONES, OF PHILADELPHIA, PENNSYLVANIA, ASSIGNOR TO THE SHARPLES SPECIALTY COMPANY, OF PHILADELPHIA, PENNSYLVANIA, A CORPORATION OF DELAWARE

FRICTION GEARING

Application filed September 28, 1926. Serial No. 138,148.

My invention relates to an improvement in friction gearing and has for its object the provision of friction gearing in which wear on the contacting friction surfaces is reduced to a minimum and in which "vibration" is effectually eliminated at all speeds.

In friction gearing, and particularly in friction gearing that includes a driving or driven member of small diameter, the frictionally engaging surfaces through which force is transmitted are in contact throughout only a small area, such area being theoretically a mere line contact and being practically not substantially greater than a line contact. In consequence slipping of the contacting surfaces upon one another results in uneven wear producing irregularity of the contacting surfaces of the gears.

In friction gearing the use of a resilient device, such as a spring or weight, for maintaining the friction gears in contact has some advantages but has heretofore produced vibration of the friction gears, particularly when the surface speed of the gears is high. When the gears are vibrating there is undesirable interruption of contact, or variation of contact-pressure, between the contacting surfaces of the gears.

An object of my invention is to provide friction gearing in which variation in the relative speeds of rotation of the driving and driven members may occur without causing wear on the contacting surfaces of the friction gears. Another object of my invention is to provide friction gearing in which vibration, that limits the speed at which friction gearing may be operated, is eliminated. A further object of my invention is to provide friction gearing in which the relative speeds of rotation of the driving and driven members may vary without the occurrence of slipping between the contacting surfaces of the friction gears.

In the practice of my invention I provide between the driving and driven members contacting friction gears that will produce the speed change that is desired and I provide two additional friction surfaces also between the driving and driven members and preferably between the driving member and the friction gear associated therewith. The power that is being transmitted is delivered from one of such additional friction surfaces to the other and such additional friction surfaces are so designed with respect to form or with respect to material or in both respects that slipping of one of such additional surfaces upon the other will not produce injurious wear and will occur between such additional surfaces rather than between the contacting surfaces of the friction gears themselves. In the practice of my invention a spring or weight or other resilient means that would ordinarily produce undesirable vibration may nevertheless be used to maintain the friction gears in engagement and in the best practice of my invention the same spring or weight or other resilient means is employed to maintain the second or additional pair of friction surfaces in engagement; and furthermore, in the practice of my invention the action of such spring or weight or other resilient means may be so controlled as to eliminate vibration of the friction gears. When the same spring or weight or other resilient means is employed to hold in engagement the friction gears and also the second or additional pair of friction surfaces, the force holding the friction gears in contact will be the same as the force holding the second or additional pair of friction surfaces in contact. Under these circumstances, if the coefficient of friction betwen the friction gears is the same as the coefficient of friction between the second or additional pair of friction surfaces, slipping may be made to occur in accordance with my invention between the second or additional pair of friction surfaces, instead of occurring between the friction gears, merely by making the torque arm of the second or additional friction surfaces less than the torque arm of the friction gear that is rotating therewith. Under these conditions the force transmitted from one of the second or additional friction surfaces to the other will be greater than the actual force transmitted by the friction gear that is rotating with one of the second or additional friction surfaces. In other words by connecting one of the friction gears to one of the additional or second pair of friction surfaces so that they rotate at the same speed, slipping will occur between the second or additional friction surfaces rather than between the friction gears when the coefficient of friction between the two pairs of friction surfaces is the same and the second or additional friction surface has a lesser torque arm than the friction gear to which that additional surface is connected.

In one embodiment of my invention the friction gearing may consist of friction gears in frictional engagement and a power transmitting member. Only one of such gears will be directly connected to a main driving or driven member, preferably the latter, and the power transmitting member will be connected to or carried by the other main driving or driven member, preferably the former. The power transmitting member and the gear that is free of or not directly connected to either main driving or driven member will respectively be provided with cooperating friction surfaces constituting an additional or second pair of friction surfaces that are of such material and form as to resist wear or to wear evenly or be uninjured thereby, e. g., such additional surfaces may be flat circular or ring-like surfaces in face contact. The coefficient of friction between the engaging surfaces of the gears and between the additional friction surfaces will be so selected and the effective torque arm of the additional friction surfaces and of the friction gear that rotates with one of the additional friction surfaces will be so proportioned, and the force with which the two pairs of friction surfaces are brought into contact will be so regulated that slipping will occur between the additional frictional surfaces rather than between the gear surfaces. For example, if the two pairs of friction surfaces are held in contact by the same force, as in the embodiment of my invention herein specifically described for purposes of illustration, and the coefficient of friction between the additional friction surfaces is not greater than the coefficient of friction between the gear surfaces, slipping will occur between the additional friction surfaces when the torque arm of one of the additional friction surfaces is less than the torque arm of the friction gear surface rotating therewith or carried thereby. Friction gearing embodying my invention may also be considered as a friction gear connected to one main shaft, a friction disk connected to the other shaft and an intermediate member, free of both shafts and having friction surfaces engaged respectively by said gear and disk.

In other embodiments of my invention the coefficient of friction between the two pairs of friction surfaces may not be the same but the additional friction surfaces will nevertheless be of such material or design that they will resist or be uninjured by wear or will wear evenly, and the gearing will be of such design, for example, with respect to torque arms, that slipping will occur between such additional friction surfaces before it occurs between the surfaces of the friction gears themselves.

In the practice of my invention the friction gears, and preferably also the additional friction surfaces, are held in contact by resilient means producing the desired contacting force, the two pairs of surfaces preferably being held in contact by the same means. But the action of that resilient contacting means is so damped or otherwise controlled that vibration that ordinarily results from the use of such resilient means is eliminated; and such damping action is preferably produced by the force exerted by such resilient means. In such case the damping force always bears a proper relation to the contacting force and except for faulty design cannot exceed the contacting force.

Other and further objects of my invention will appear from the following description taken in connection with the accompanying drawing which shows, partly in elevation and partly in cross section, friction gearing constituting one illustrative embodiment of my invention.

Referring to the drawing, one member, preferably the driving member, comprising the shaft 1 is supported in bearings 2 and 3 and may have mounted upon it any desired driving device such as the pulley 5. A friction disk 6 is mounted upon the shaft 1 and suitably held in place thereon as by set screws 7 and 8. The friction disk 6 is provided with a hub 9 upon which an intermediate friction disk 10 is mounted for rotation. The hub 11 of the intermediate disk 10 is preferably provided with a bearing such as a Babbit metal bushing 12. Intermediate friction disk 10 is provided with a friction face such as a ring or circular band of friction material 27 of any suitable character that may be held in place in any manner as by being cemented to the disk 10. If desired the friction material 27 may be placed within a shoulder 28 as shown. The ring of friction material 27 is shown as having a diameter not greater than the diameter of the friction disk 6. Also on the face of the intermediate disk 10 a second circular face of friction material 14 is mounted as by being located in a groove in a face of the disk as shown. The rings 14 and 27 of frictional material are preferably, but not necessarily, located on opposite faces, as shown, of the disk 10. The other member of the friction gearing, which may be either the driving or driven member may consist of a shaft 16 mounted in a bearing 17. A friction wheel 15 is mounted upon the shaft 16 and frictionally engages the ring of friction material 14.

In the embodiment of my invention shown the ring of friction material 14 is of greater diameter than the ring of friction material 27 and the force that must be transmitted by friction is therefore appreciably less at the ring of friction material 14 than it is at the ring of friction material 27. The materials of the friction surfaces will be so chosen with respect to their coefficients of friction that any slipping will occur under these conditions at the point where the greatest force must be transmitted by friction, namely, on the ring of friction material 27 which is flat and is in contact with the flat face of the friction disk 6. It is thus apparent that slipping that would occur in ordinary friction gearing between the ring of friction material 14 and the friction wheel 15 will be eliminated and that necessary or desired slipping will occur between flat surfaces that will resist wear or will not be injured thereby and will wear evenly.

For the purpose of holding the friction gears in contact a resilient force is highly advantageous, particularly in friction gearing of the type above described wherein the gearing may be operated at very high speeds but in previous constructions unavoidable irregularities of the surfaces of the friction gears cause excessive vibration particularly when resilient force is so employed. In accordance with my invention the force holding the friction gears in contact is produced by resilient means and the same force is preferably employed to hold the additional friction surfaces in contact. But, that force is so damped or controlled that vibration is reduced to harmless proportions or does not occur, such damping preferably being caused by the force itself. If contact be broken or if the force of contact be reduced between the friction disk and the friction wheel in previous constructions, particularly those employing resilient contact means, there is in effect a hammer blow between the parts when operative conditions are restored; and unnecessarily large loads will be imposed upon the bearings with resulting noise and the probable development of ripples on the friction surfaces. To this end my invention includes resilient means for holding the friction surfaces in frictional engagement and damping means whereby the resilience of such resilient means will be prevented from causing serious vibration. To accomplish this object of my invention a casing or slideway 21 is provided which may be mounted upon the bearing 2 as by bolts 29; and means for applying a resilient force to the bearing pin 18 of the shaft 1, and thus to the friction surfaces, and means for damping that resilient force are carried by casing or slideway 21. Within the casing or slideway 21 is slidably mounted plunger 20 that has a groove 23 within which acts pin 22 to prevent rotation of plunger 20. Plunger 20 is provided with recess 30 that preferably has a hardened bearing member 31 at its inner end and that accommodates a bearing member such as the ball 19, the ball 19 engaging the bearing pin 18. A second plunger 20' is located within the casing or slideway 21 and the faces 26 of the plungers 20 and 20' are in engagement. Spring 24 engages the outer end of the plunger 20' and its tension is adjusted by means of screw plug 25 that is locked in position by the nut 25'. The tension of spring 24 holds both pairs of friction surfaces in contact under the same pressure. The engaging faces 26 of the plungers 20 and 20' are made oblique to the axis of the plungers and the compression of spring 24 causes the plungers 20 and 20' to bind slightly within the casing or slideway 21. Thus any impulse tending to start vibration is damped in both directions and the damping effect may be increased by decreasing the angle between the contacting faces 26 and the axis of the plungers 20 and 20'. If a great enough shock occurs between the friction material 14 and the friction wheel 15 to cause the contacting surfaces of those parts to separate, the friction disk 10 will move up slowly toward the friction wheel 15 instead of bringing the friction material 14 into engagement with the friction wheel 15 with a shock.

In the particular embodiment of my invention illustrated and above described the force that is damped also produces a damping action of that force that is proportional to the angle and coefficient of friction between the contacting faces 26 and between the plungers 20 and 20' and slideway 26 and the damping effect can never defeat the contacting effect of the force so long as that angle is properly chosen. With any angle greater than a certain minimum the damping force cannot become greater than the contacting force and the two actions can be made substantially equal and the movement of the disk may be made sluggish, a condition that is very desirable. If a shock separates the surfaces of the friction gears or reduces the pressure between them, and the speed of the driven member drops behind that of the driving member during such disengagement or reduction of contacting pressure, slipping will occur between the flat surface of the disk 6 and the flat surface of the friction material 27, and not between the friction material 14 and the wheel 15, while the parts are being brought up to speed.

In the operation of a centrifuge, which is an important application of my invention, my friction gearing may be so designed that a force of six pounds is transmitted by friction between the friction wheel 15 and the friction surface 14. In order to transmit this force the surface of the gears may be brought together with a pressure of approximately twenty pounds, a greater pressure being undesirable because it would lead to wear and vibration and unduly increase the thrust in the thrust bearing and the radial pressure in the bearings of the high speed shaft. The parts are so designed and adjusted that under these conditions there will be no slipping at either friction point. If vibration occurs and throws the friction gears out of contact they will be brought back into contact but any slippage while the parts are being brought up to the proper relative speeds will occur between the flat friction surfaces and will not result in wear of the friction wheel. If an electric motor is used to drive the low speed shaft such motor will exert greater torque at starting and at speeds below normal speed, perhaps a torque that would require transmitting a force of sixty pounds at the point of contact between the friction gears. It is undesirable to employ a contacting force high enough to prevent slippage under these conditions. It is, however, undesirable to have slippage between the friction gears, the surface of at least one of which is curved. On the other hand it is desirable to have the motor come up to speed as soon as possible. In the practice of my invention such excessive starting torque will result only in slippage between flat surfaces and no harm will be done and the desirable speed of the motor will be quickly attained. Furthermore, if bearings lock or bind the resulting slippage will result only in a relative movement of the flat friction surfaces.

While I have described a preferable form of my invention with considerable detail I do not intend that I shall be limited to the particular form shown or to the details thereof; but intend that my invention shall include such modifications and variations as fall within the hereunto appended claims. In this connection it is to be noted that the casing 21 which is primarily a guide for the plungers 20 and 20' may be of any form so long as pressure of the plungers 20 and 20' against each other will produce a binding action between the plungers and their guide or casing or slideway; and it is obvious that the plungers may be of any form and that they might each consist of several parts so long as pressure between them comes upon oblique surfaces and causes a binding action between the plungers and their guide or casing. It is also to be noted that in friction gearing embodying my invention power is transmitted from a driving shaft to a driven shaft by being passed through 2 pairs of friction surfaces that are arranged in series in the sense that the power is first transmitted from a friction surface of one pair of surfaces to the other friction surface of that pair and then passed from a friction surface of the second pair of surfaces to the other friction surface of that pair.

What I claim as new and desire to secure by Letters Patent is:

1. In friction gearing, a driving member, a driven member, two pairs of frictionally engaging power transmitting surfaces arranged in series relation for transmitting power from said driving member to said driven member, one of said pairs of surfaces being capable of transmitting more power by friction than the other, and a single damped means acting to hold said pairs of surfaces in contact.

2. In friction gearing, a first pair of power transmitting friction surfaces in rolling contact, a second pair of power transmitting plane friction surfaces in face contact and arranged in series relation with said first pair of friction surfaces, said first pair of friction surfaces being capable of transmitting more power by friction than said second pair of friction surfaces, and a single resilient means acting to hold said pairs of surfaces in contact.

3. In friction gearing, a first pair of power transmitting friction surfaces in rolling contact, and a second pair of power transmitting plane friction surfaces in face contact and arranged in series relation with said first pair of friction surfaces, and said surfaces in face contact being adapted always to slip without transmitting great enough power to cause slipping of said surfaces in rolling contact.

4. In friction gearing, a first pair of power transmitting friction surfaces in rolling contact, and a second pair of power transmitting friction surfaces in face contact and arranged in series relation with said first pair of friction surfaces, a single resilient means for holding said pairs of surfaces in contact, and damping means for said resilient means and actuated by the force thereof.

5. In friction gearing, a first pair of power transmitting friction surfaces in rolling contact, and a second pair of power transmitting friction surfaces in face contact and arranged in series relation with said first pair of friction surfaces, and a single self-damping resiliently actuated means for contacting said pairs of surfaces.

6. In friction gearing, first and second members in frictional engagement, a power transmitting member frictionally engaging said first member, with a coefficient of friction less than or substantially equal to that between said first and second members, at a point thereof radially inward of the point at which said first member engages said second member, resilient means holding said first and second members and said power transmitting member in frictional engagement, and means for damping movement of said first and second members toward and from each other.

7. In friction gearing, a friction wheel, a friction disk in engagement therewith, a power transmitting member in frictional engagement with said disk, resilient means holding said wheel and disk and transmitting member in frictional engagement, and means for damping movement of said disk and wheel from and toward each other.

8. In friction gearing, first and second members in frictional engagement, means acting to press said members into frictional engagement comprising two members having contacting surfaces oblique to the axis of said first member, one of said members engaging said first member, a spring engaging the other of said contacting members, and a guide engaging said contacting members and holding them coaxial therewith.

9. In friction gearing, first and second members in frictional engagement, a spring for holding said members in engagement, a guide, and means within the guide and engaging said first member and engaged by said spring for spreading into frictional engagement with said guide under compression between said spring and said first member.

10. Means for bringing members of friction gearing into contact with each other comprising a guide, plungers within the guide and thereby held coaxial therewith and contacting at surfaces oblique to the axis thereof, one of said plungers being adapted to engage one of the members of said gearing, and a spring engaging the other of said plungers.

11. In friction gearing an axially movable intermediate disk, a friction wheel engaging one surface of said disk, a power transmitting member frictionally engaging the other surface of said disk, a spring for pressing said transmitting member toward said disk, and damping means between the said spring and transmitting member.

12. In friction gearing, first and second members in frictional engagement, means for resiliently moving the first of said members into frictional engagement with the second of said members, and means for damping the movement of the first of said members from and toward the second of said members.

13. In friction gearing, friction members mounted for rotation, one of which is movable into contact with the other, and self-damping resiliently actuated means for moving said last named member into contact with the other of said members.

14. In friction gearing, first and second members in frictional engagement, means for resiliently moving the first of said members into frictional engagement with the second of said members, and means for damping the movement of the first of said members from and toward the second of said members with a force proportional to that tending to cause such movement.

15. In friction gearing, a pair of members in frictional engagement, a guide, a pair of plungers in said guide and thereby held coaxial therewith having oblique contacting surfaces, one of said plungers engaging one of said members, and resilient means engaging the other of said plungers for maintaining said members in frictional engagement.

In testimony whereof, I have signed my name to this specification.

LEO D. JONES.